(12) United States Patent
Massard et al.

(10) Patent No.: US 8,743,450 B2
(45) Date of Patent: Jun. 3, 2014

(54) ELECTROWETTING DISPLAY DEVICE

(75) Inventors: Romaric Massard, Eindhoven (NL); Robert Hayes, Hong Kong (CN); Bokke Johannes Feenstra, Neunen (NL)

(73) Assignee: Liquavista B.V., Eindhoven (NL)

( * ) Notice: Subject to any disclaimer, the term of this patent is extended or adjusted under 35 U.S.C. 154(b) by 61 days.

(21) Appl. No.: 13/531,022

(22) Filed: Jun. 22, 2012

(65) Prior Publication Data

US 2013/0010348 A1    Jan. 10, 2013

Related U.S. Application Data

(63) Continuation of application No. PCT/EP2010/070695, filed on Dec. 23, 2010.

(30) Foreign Application Priority Data

Dec. 30, 2009    (GB) .................................... 0922690.3

(51) Int. Cl.
*G02B 26/00* (2006.01)
*G02B 26/02* (2006.01)

(52) U.S. Cl.
USPC .......................................... 359/290; 359/228

(58) Field of Classification Search
USPC ......... 359/290–296, 298, 227, 228, 230, 237, 359/238, 245–247, 250, 253; 257/57, 59, 257/E29.273; 252/500, 519.21, 519.2; 29/825; 427/58; 106/31.49, 287.2, 106/287.24; 156/146; 516/198, 204; 345/107; 445/24

See application file for complete search history.

(56) References Cited

U.S. PATENT DOCUMENTS

| | | | |
|---|---|---|---|
| 4,079,368 A | 3/1978 | Distefano | |
| 6,924,792 B1 * | 8/2005 | Jessop | 345/179 |
| 7,310,080 B2 * | 12/2007 | Jessop | 345/89 |
| 8,111,447 B2 * | 2/2012 | Fairly et al. | 359/296 |
| 8,111,465 B2 * | 2/2012 | Heikenfeld et al. | 359/665 |
| 8,199,409 B2 * | 6/2012 | Hayes et al. | 359/665 |

(Continued)

FOREIGN PATENT DOCUMENTS

| | | |
|---|---|---|
| WO | 03071346 A1 | 8/2003 |
| WO | 2005098797 A3 | 10/2005 |

(Continued)

OTHER PUBLICATIONS

Zhou, et al, "A full description of a simple and scalable fabrication process for electrowetting displays," Journal of Micromechanics and Microengineering, 19 (2009) 065029 (12pp).

(Continued)

*Primary Examiner* — Loha Ben
(74) *Attorney, Agent, or Firm* — BainwoodHuang

(57) ABSTRACT

The present invention relates to a method for making an electrowetting display device comprising a plurality of picture elements and a first support plate and a second support plate. Each picture element comprises a space between the first support plate and the second support plate. The method comprises the steps of: providing the first support plate with an electrode structure; arranging an insulating layer on the electrode structure, the insulating layer having a thickness and a hydropobic surface facing the space; temporarily applying an electric field across the thickness of the insulating layer to reduce permanently the hydrophobicity of a predetermined area of the surface. The invention further relates to an electrowetting display device and a use of an area of reduced hydrophobicity in an electrowetting device.

15 Claims, 4 Drawing Sheets

(56) References Cited

U.S. PATENT DOCUMENTS

| | | | |
|---|---|---|---|
| 8,384,985 B2 * | 2/2013 | Giraldo | 359/292 |
| 8,416,488 B2 * | 4/2013 | Hayes et al. | 359/290 |
| 8,508,436 B2 * | 8/2013 | Jessop | 345/49 |
| 8,508,468 B2 * | 8/2013 | Huitema | 345/107 |
| 2004/0196525 A1 | 10/2004 | Fujii | |
| 2009/0168144 A1 | 7/2009 | Lo et al. | |
| 2009/0191334 A1 | 7/2009 | Dai et al. | |

FOREIGN PATENT DOCUMENTS

| | | |
|---|---|---|
| WO | 2005101855 A1 | 10/2005 |
| WO | 2006090317 A1 | 8/2006 |
| WO | 2007141220 A1 | 12/2007 |
| WO | 2009065909 A1 | 3/2009 |
| WO | 2009071694 A2 | 3/2009 |

OTHER PUBLICATIONS

Feenstra, B.J. Feenstra en M.W.J. Prins, Elektrobevochtiging: vloeistofmanipulatie op micronschaal. NTVN 67/2, p. 34 (Feb. 2001).

Verheijen, H.J.J. et al, "Reversible electrowetting and trapping of charge," Philips Research Laboratories, Eindhoven, Prof. Holstlaan 4, 5656 AA Eindhoven, The Netherlands, Received May 7, 1999, in Final Form: Aug. 2, 1999 (c) 1999 American Chemical Society, Langmuir 1999, 15, 6616-6620.

Vermeulen, Paul et al., "Method for Making Electrowetting Display Device," U.S. Appl. No. 13/461,129, filed May 1, 2012.

\* cited by examiner

ELECTROWETTING DISPLAY DEVICE

FIELD OF THE INVENTION

The present invention relates to an electrowetting display device and a method for making the same.

BACKGROUND OF THE INVENTION

An electrowetting display device, such as described in the international patent application WO 2003/071346, includes two support plates. A pattern of walls is arranged on one of the support plates, the pattern defining the picture elements of the display device. The area between the walls of a picture element, also known as a pixel, is called the display area, over which a display effect occurs. The walls of the picture elements are made of a hydrophilic material. The area of the support plate in the display area must to a large extent be hydrophobic for a proper operation of the picture element. During manufacture the area of the support plate where the picture elements are located is covered by a hydrophobic layer. The walls are made on this layer by depositing a layer of wall material onto the hydrophobic layer and patterning the layer of wall material using e.g. a photo-lithographic method.

The adhesion between the layer of wall material and the hydrophobic layer is relatively poor, causing easy peel off of the layer of wall material from the hydrophobic layer. It is known to lower the hydrophobicity of the hydrophobic layer prior to applying the layer of wall material by for example reactive ion etching. After the formation of the walls, the hydrophobic layer is annealed to regain its hydrophobicity. However, the quality of display devices made using this method is not satisfactory.

Other methods use a photo-lithographic step to lower the hydrophobicity only in a predetermined area by applying for example reactive ion etching, plasma or UV ozone treatment in the exposed area. Disadvantages are the requirement of an extra lithographic step and the difficulty of applying a lithographic process on a uniform hydrophobic surface with an increased risk of delamination.

It is an object of the invention to provide a method for making an electrowetting display device that does not have this disadvantage.

SUMMARY OF THE INVENTION

In accordance with a first aspect of the present invention, there is provided a method for making an electrowetting display device comprising a plurality of picture elements and a first support plate and a second support plate, each picture element comprising a space between the first support plate and the second support plate, the method comprising the steps of: providing the first support plate with an electrode structure; arranging an insulating layer on the electrode structure, the insulating layer having a thickness and a hydrophobic surface facing the space; temporarily applying an electric field across the thickness of the insulating layer to reduce permanently the hydrophobicity of a predetermined area of the surface.

The method according to the invention allows a local lowering of the hydrophobicity of a predetermined area of the insulating layer by application of an electric field. The method does not require reducing and thereafter increasing the hydrophobicity of the surface, which affects the longevity of the display device. Since a display made by the method according to the invention is not subject to the process steps of decreasing and increasing the hydrophobicity, it has a better longevity. Moreover, annealing, used for increasing the hydrophobicity, does not fully recover the quality of a pristine hydrophobic surface. The method according to the invention does not require use of a photo-lithographic process for local lowering of the hydrophobicity as in the prior art. Hence, the number of process steps is reduced and there is less risk of delamination. The area of reduced hydrophobicity may be used for various purposes in the manufacture of the display device and/or in use of the display device. An area is said to have a reduced hydrophobicity if the area exerts a less repellent force on an electroconductive or polar fluid than an area having a non-reduced hydrophobicity; the force may become attractive when the hydrophobicity has been reduced sufficiently. The degree of hydrophobicity reduction of the area may be controlled by the strength of the electric field.

The reduced hydrophobicity of the insulating layer is probably due to accumulation of charge in or on the insulating layer. When the reduced hydrophobicity is used in the manufacture of the display device, the reduction is called 'permanent' if it persists for at least one day. When the reduction is used for operation of the display device, the reduction is called 'permanent' if it persists during the lifetime of the display device. After the electric field has been switched off, part of the applied charge may leak away; however, another part stays permanently.

It should be noted that the article 'Elektrobenatting: Vloeistofmanipulatie op microschaal' by B. J. Feenstra and M. W. J. Prins in Nederlands Tijdschrift voor Natuurkunde of February 2001, page 34, discloses that the application of an electric field above a certain strength causes undesirable charge accumulation in the insulating layer of an electrowetting device. It does not disclose that the area with charge accumulation displays a reduced hydrophobicity, nor does it point towards a use of the charge accumulation.

In a special embodiment the area forms a similar pattern in substantially all of the picture elements. 'Substantially' means that most of the picture elements comprise the pattern, preferably more than 90%.

In a preferred embodiment of the method an electroconductive or polar fluid is arranged on the insulating layer and the electric field is applied between the electrode structure and the fluid. The method applies the electric field effectively and in the desired area. Use of the electrode structure causes the areas of reduced hydrophobicity to be aligned properly with the electrode structure without any further alignment measures to be taken.

The electrode structure preferably includes at least one electrode for applying the electric field and at least one electrode for operating a picture element or the electrode structure includes at least one electrode both for applying the electric field and operating a picture element.

Specific electrodes of the electrode structure may be used either for operation of the picture element or for generating the electric field for reducing hydrophobicity locally or specific electrodes may be used for both functions. The function may determine the locations of electrodes in the picture element. For example, gate and source lines may be used to generate the electric field for reducing the hydrophobicity in an area where a wall is to be arranged.

In an advantageous embodiment the electric field is made by applying a voltage between the electrode structure and the electroconductive or polar fluid, the voltage on the electrode structure being higher than the voltage on the electroconductive or polar fluid. The use of this polarity is more effective in creating a permanent low-hydrophobicity area.

The electric field may be applied before or after filling the display device with the first fluid. When the electric field is applied before filling with the first fluid, the first support plate with the electrodes and insulating layer is covered with a conductive or polar fluid and the voltage is applied between the conductive or polar fluid and the electrode. The conductive or polar fluid may be the second fluid used during operation of the display device.

When the electric field is applied after filling with the first fluid, e.g. after the first and second support plate have been sealed together, the high voltage may be applied between the conductive or polar fluid and the electrode. This voltage will remove the first fluid from the area where the hydrophobicity is to be reduced. Preferably, the voltage is increased stepwise or ramped up to control the removal of the first fluid. It is also possible to remove the first fluid from the area in a separate step preceding the application of the high voltage by applying a voltage between electrodes on the first support plate and the conductive or polar fluid.

The step of applying the high electric field between one or more electrodes on the first support plate and the conductive or polar fluid after the first and second support plate have been sealed together can also be repeated later during the lifetime of the display. As such, this step can substantially keep the amount of charge in or on the insulating layer constant or sufficiently high for the use in the display device.

An electrode in the electrode structure may have a neighbouring shield electrode. The shield electrode confines the electric field and thereby assists in defining the extent of the area where the hydrophobicity is reduced. Preferably, an electrode has a shield electrode on each side.

A special embodiment of the method includes the step of arranging walls on the predetermined area. Since the hydrophobicity of the predetermined area has been reduced, the adherence between the wall material and the insulating layer has improved and there will be less risk of peeling off of the wall material.

In accordance with a second aspect of the invention there is provided an electrowetting display device comprising a plurality of picture elements and a first support plate and a second support plate, each picture element comprising a space between the first support plate and the second support plate, the space comprising a first fluid and a second, electroconductive or polar fluid, the first fluid and second fluid being immiscible, an electrode structure arranged on the first support plate, an insulator layer arranged on the electrode structure and having a hydrophobic surface facing the space, the insulator layer having a predetermined area of reduced hydrophobicity made using a method according to the invention.

In a special embodiment of the display device the area of the hydrophobic surface carries a permanent electric charge. The presence of an electric charge can be measured using an electrostatic voltmeter. The permanency of the charge can be determined in the absence of voltages applied to the electrode structure.

The area forms preferably a similar pattern in substantially all of the picture elements.

Advantageously, the pattern defines the shape of the picture element and confines the first fluid to the space of the picture element. The area acts as a zero-height wall of the picture element. The area will usually have the shape of a square or rectangular grid. The reduced hydrophobicity of the area confines the first fluid to within the region enclosed by the walls. Since the thickness of the first fluid near a zero-height wall is zero, the switching behaviour of the picture element will be improved, noticeable amongst others in the improved gray-scale capability of the display device.

The pattern preferably defines the shape of the picture element and walls are arranged on the area, the walls confining the first fluid to the space of the picture element. When walls made of a certain wall material are arranged on the area, the reduced hydrophobicity improves the adhesion between the wall material and the insulating layer.

In a special embodiment of the display device the pattern forms an initiation point for the picture element, providing a position for the first fluid to start moving from when the display device is in operation. As such, an initiation point in a picture element improves the switching and the gray-scale capability.

The pattern may form a barrier for the first fluid in a picture element. The barrier can be used in a bistable display device. A voltage pulse on an electrode can move the first fluid across the barrier; the barrier will keep the first fluid in position if the voltages are reduced to zero. Image content will be non-volatile. Hence, the power consumption of a display device using a barrier can be relatively low.

In accordance with a third aspect of the invention there is provided a use of an area of reduced hydrophobicity in an electrowetting device comprising an electrowetting element and a first support plate and a second support plate, the electrowetting element comprising a space between the first support plate and the second support plate, the space comprising a first fluid and a second, electroconductive or polar fluid, the first fluid and second fluid being immiscible, an electrode structure arranged on the first support plate, and an insulator layer arranged on the electrode structure and having a hydrophobic surface facing the space, the area having been made by applying temporarily an electric field across the thickness of the insulating layer to reduce permanently the hydrophobicity of the area of the surface, said use being control of motion of the fluids or adhering a layer onto the insulating layer.

Further features and advantages of the invention will become apparent from the following description of preferred embodiments of the invention, given by way of example only, which is made with reference to the accompanying drawings.

DETAILED DESCRIPTION OF THE INVENTION

Figure 1:
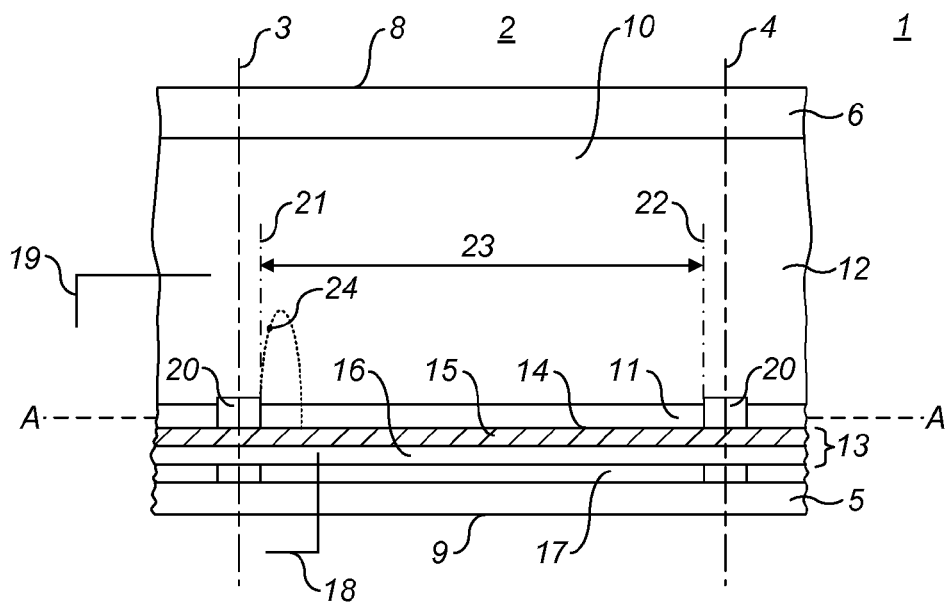
FIG. 1 shows a schematic cross section of a picture element of an electrowetting display device.

FIG. 1 shows a diagrammatic cross-section of part of an electrowetting display device 1. The display device includes a plurality of picture elements 2, one of which is shown in the Figure. The lateral extent of the picture element is indicated in the Figure by two dashed lines 3, 4. The picture elements comprise a first support plate 5 and a second support plate 6. The support plates may be separate parts of each picture element, but the support plates are preferably shared in common by the plurality of picture elements. The support plates may include a glass or polymer substrate and may be rigid or flexible.

The display device has a viewing side 8 on which an image or display formed by the display device can be viewed and a rear side 9. In the figure the first support plate 5 faces the rear side 9; the second support plate 6 faces the viewing side; alternatively, the first support plate may face the viewing side. The display device may be of the reflective, transmissive or transflective type. The display device may be of a segmented display type in which the image may be built up of segments, each segment including several picture elements. The display device may be an active matrix driven display type or a passively driven display device. The plurality of picture elements may be monochrome. For a colour display device the picture elements may be divided in groups, each group having a different colour; alternatively, an individual picture element may be able to show different colours.

A space 10 between the support plates is filled with two fluids: a first fluid 11 and a second fluid 12. The second fluid is immiscible with the first fluid. The second fluid is electrically conductive or polar, and may be water or a salt solution such as a solution of potassium chloride in a mixture of water and ethyl alcohol. The second fluid is preferably transparent, but may be coloured, white, absorbing or reflecting. The first fluid is electrically non-conductive and may for instance be an alkane like hexadecane or (silicone) oil.

The first fluid absorbs at least a part of the optical spectrum. The first fluid may be transmissive for a part of the optical spectrum, forming a colour filter. For this purpose the first fluid may be coloured by addition of pigment particles or dye. Alternatively, the first fluid may be black, i.e. absorb substantially all parts of the optical spectrum, or reflecting. A reflective layer may reflect the entire visible spectrum, making the layer appear white, or part of it, making it have a colour.

An insulating layer 13 is arranged on the support plate 5. The insulating layer may be transparent or reflective. The insulating layer 13 may extend between walls of a picture element. However, to avoid short circuits between the second fluid 12 and electrodes arranged under the insulating layer, the insulating layer is preferably an uninterrupted layer extending over a plurality of picture elements 2, as shown in the Figure. The insulating layer has a hydrophobic surface 14 facing the space 10 of the picture element 2. The thickness of the insulating layer is preferably less than 2 micrometer, more preferably less than 1 micrometer.

The insulating layer may be a hydrophobic layer; alternatively, it may be a hydrophobic layer 15 and a dielectric layer 16, the hydrophobic layer 15 facing the space 10, as shown in the Figure. The hydrophobic layer may be for instance an amorphous fluoropolymer layer such as AF1600 or AF1601 or another low surface energy polymer. The thickness of the hydrophobic layer is preferably between 300 and 800 nm. The dielectric layer may be a silicon oxide layer or a silicon nitride layer, having a thickness of for example 200 nm.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid.

Each element 2 includes an electrode 17 arranged on the support plate 5. The electrode 17 is separated from the fluids by the insulating layer 13; electrodes of neighbouring picture elements are separated by a non-conducting layer. Other layers may be arranged between the insulating layer 13 and the electrode 17. The electrode 17 can be of any desired shape or form. The electrode 17 of a picture element is supplied with voltage signals by a signal line 18, schematically indicated in the Figure. A second signal line 19 is connected to an electrode which is in contact with the conductive second fluid 12. This electrode may be common to all elements, when they are fluidly interconnected by and share the second fluid, uninterrupted by walls. The picture element 2 can be controlled by a voltage V applied between the signal lines 18 and 19. The electrodes 17 on the support plate 5 are coupled to a display driving system. In a display device having the picture elements arranged in a matrix form, the electrodes can be coupled to a matrix of control lines on the first support plate.

The first fluid 11 is confined to one picture element by walls 20 that follow the cross-section of the picture element. The cross-section of a picture element may have any shape; when the picture elements are arranged in a matrix form, the cross-section is usually square or rectangular. Although the walls are shown as structures protruding from the support plate 5, they may also be a surface layer on the support plate that repels the first fluid, such as a hydrophilic or less hydrophobic layer. The walls may extend from the first to the second support plate but may also extend partly from the first support plate to the second support plate. The extent of the picture element, indicated by the dashed lines 3 and 4, is defined by the centre of the walls 20. The area between the walls of a picture element, indicated by the dashed lines 21 and 22, is called the display area 23, over which a display effect occurs.

When no voltage is applied between the electrodes, the first fluid 11 forms a layer between the walls 20, as shown in the Figure. Application of a voltage will contract the first fluid, for example against a wall as shown by the dashed shape 24 in the Figure. The controllable shape of the first fluid is used to operate the picture element as a light valve, providing a display effect over the display area 23.

Figure 2A:
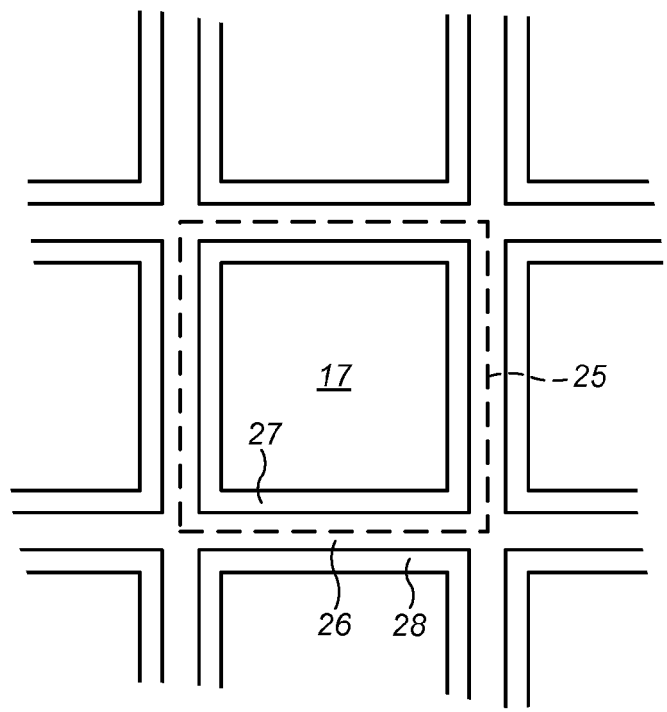
FIG. 2a shows a schematic plan view of the electrode structure on the first support plate of the display device.
Figure 2B:
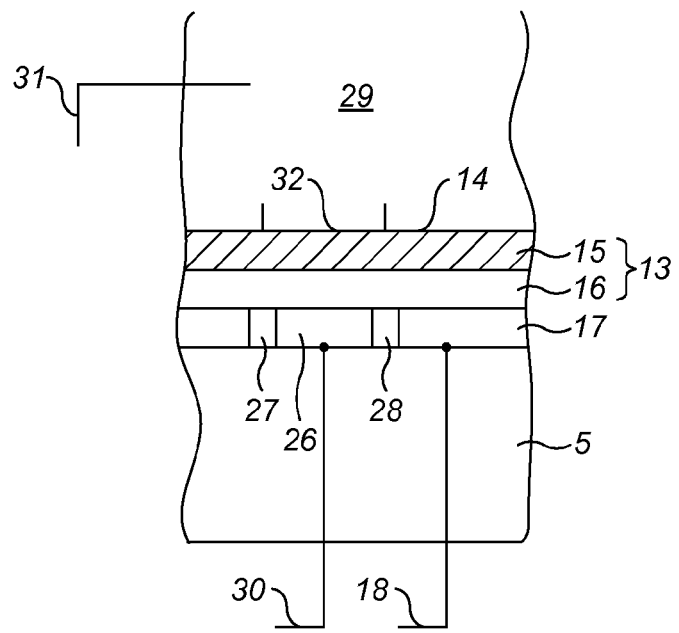
FIG. 2b shows a schematic cross section of the first support plate.

The walls 20 in the embodiment of the display device shown in FIG. 1 have been made using the hydrophobicity reducing effect according to the invention. The effect is obtained by means of a patterned electrode structure shown in plan view in FIG. 2a, along line A-A in FIG. 1, and in cross-section in FIG. 2b. FIG. 2a shows a matrix of square picture elements. The extent of the central picture element in FIG. 2a, corresponding to the dashed lines 3 and 4 in FIG. 1, is indicated by the dashed line 25. The electrode 17 is used for operating the picture element. An electrode 26 is arranged between neighbouring electrodes 17 in the form of a grid. Regions 27 and 28 between the electrodes 17 and 26 are made of an insulating material. FIG. 2b shows a cross-section of the support plate 5 and the electrodes 17 and 26.

During the manufacturing process of the display device, a patterned electrode structure comprising electrodes 17 and 26 is provided on the first support plate 5. Subsequently, an insulating layer 13 is arranged on the electrode structure. The surface 14 of the insulating layer 13 is covered with a conductive fluid, preferably the same electroconductive or polar fluid used as second fluid in the completed display device. The space filled with the conductive fluid is indicated by reference numeral 29 in FIG. 2b.

The local hydrophobicity reduction of the surface 14 according to the invention is now achieved by applying a voltage between a signal line 30, connected to the electrode 26, and a signal line 31, connected to an electrode which is in contact with the conductive fluid in space 29. The voltage is DC and the signal line 30 is preferably positive. The voltage creates an electric field across the thickness of the insulating layer 13. The electric field must be above a threshold value, above which a permanent reduction of the hydrophobicity of the surface 14 occurs. The threshold value depends on the material and the thickness of the insulating layer as well as on the material of the conductive fluid. The electric field must be smaller than the breakdown dielectric strength of the insulating layer. Voltages may be in the range of 100 to 400 V and preferably applied for a period of a few seconds to several minutes. The permanent reduction of the hydrophobicity may be determined by measuring the presence of a permanent electric charge on or in the insulating layer using, for instance, an electrostatic voltmeter.

The predetermined area of the surface 14 where the hydrophobicity is reduced permanently is indicated in FIG. 2*b* by reference numeral 32. The extent of this area is determined by the shape of the electrode 26 and the stray fields. A common width of the electrode 26 is 5 to 15 micrometer. The width of the area 32 is 8 to 20 micrometer when the thickness of the insulating layer is 1 micrometer.

The extent of the area 32 can be reduced by arranging shield electrodes neighbouring the electrode 26 and kept at the potential of the conductive fluid. The embodiment shown in FIG. 2*b* uses the electrode 17 as shield electrode. Thereto the signal line 18 of each picture element, connected to the electrode 17, is kept at the same voltage as the signal line 31. In an alternative embodiment, the electrode 26 may have shield electrodes that are not used for the operation of the picture element.

Figure 3:
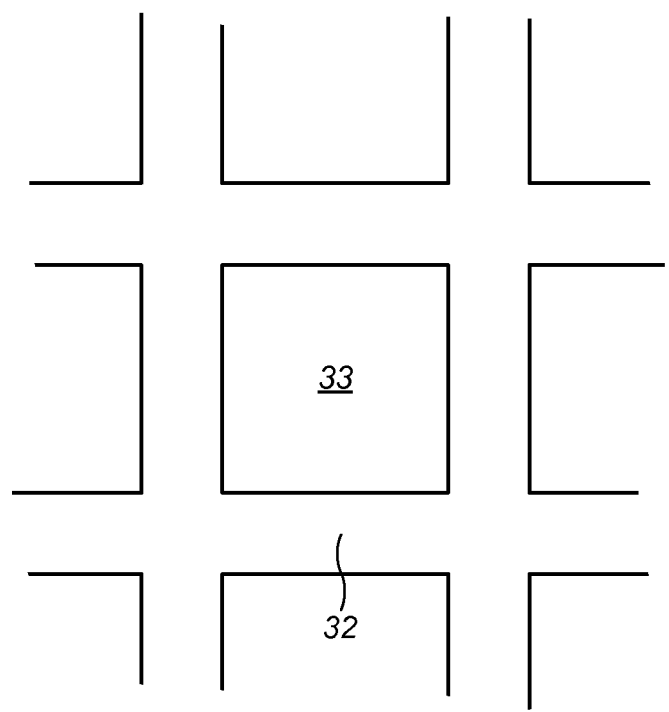
FIG. 3 shows a plan view of the surface of the insulating layer.

After the temporary application of the electric field, the grid-shaped area 32 of the surface 14, having the shape of the electrode 26 as shown in FIG. 2*a*, has a reduced hydrophobicity. FIG. 3 shows a plan view of the surface 14 with the low-hydrophobicity area 32 and a pristine area 33 enclosed by the area 32. The hydrophobicity of the pristine area 33 has not been altered by the application of the electric field. The shape of the pristine area 33 corresponds to the display area 23 in FIG. 1. Preferably the pristine area 33 is slightly larger than the display area 23, for example by a few micrometer on either side, thereby allowing accommodation of small misalignments of the walls on the low-hydrophobicity area 32. In a subsequent manufacturing step, walls may be arranged on the low-hydrophobicity area 32.

In a special embodiment the pristine area 33 may be slightly smaller than the display area 23, creating an elongate area next to a wall where the hydrophobicity is reduced. This elongate area can operate as an initiation point for movement of the first fluid as explained below with reference to FIG. 5.

The walls may be made by several methods. In a first method the walls are manufactured using a lithographic step, in which the display area 23 in FIG. 1 is covered by a lacquer and the area on which the walls are to be deposited is uncovered. The uncovered area corresponds to the low-hydrophobicity area 32. The walls are made using a known deposition process, such as spin coating, dip coating, slit coating or a printing process. After application of the walls, the lacquer is removed from the display area. The low hydrophobicity of the surface 14 under the wall improves the adherence of the wall material to the insulating layer 13.

In a second method the walls are manufactured using lithography, where the photo lacquer is made of the wall material. In this method, the lacquer is deposited on the surface 14 with conventional methods. Next, the lacquer is removed from the display area 23 and the material remains as picture element walls, centred on the low-hydrophobicity area 32.

In a third method the walls are manufactured using self-assembly. The difference in hydrophobicity between the low-hydrophobicity area 32 and the pristine area 33 of the surface 14 forms a chemical contrast. The surface 14 is covered by a liquid comprising a solution or dispersion of wall material. The wall material is selected to have a higher adherence to a hydrophilic than to a hydrophobic surface. Hence, the wall material migrates towards the low-hydrophobicity area 32, where it forms a wall. After completion of the wall formation, the liquid with the remaining wall material is poured off the first support plate or the solvent of the wall material solution evaporates, leaving the solid wall material.

In the first, second and third method the reduced hydrophobicity of the area 32 may persist during the lifetime of the display device. Alternatively, it may persist only during the time of manufacturing the display device, preferably one day or longer.

In a fourth method the walls are formed by the low-hydrophobicity area 32 itself, i.e. the walls have a zero height. The hydrophobicity of the area 32 must be sufficiently low to restrict the first fluid 11 in FIG. 1 to the display area 23, both when the first fluid is spread out over the display area and when it is contracted. The reduced hydrophobicity of the area 32 must persist during the lifetime of the display device.

If, in a reflective display the electrode 26 is made of a light-reflecting material, the wall material is preferably opaque to avoid ambient light entering from the viewing side 8 to reflect on the electrode back into the viewing direction, thereby reducing the contrast of the image displayed. Alternatively, the electrode 26 can be made of a transparent material, such as ITO; any back reflection can be further reduced by arranging a light-absorbing layer on or behind the first support plate that captures light transmitted through the walls.

After formation of the walls 20 the first fluid is applied to the first support plate 5 using a known method, as disclosed for example in international patent application WO2005/098797. The first and second support plate are mounted together and the space filled with the second liquid in known manner, as disclosed e.g. in international application WO2009/065909.

Figure 4:
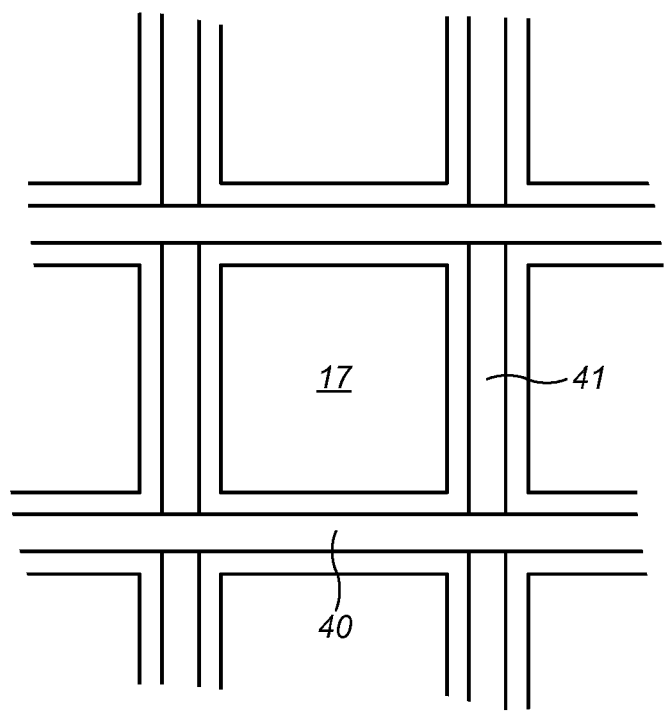
FIG. 4 shows a plan view of the electrode structure with crossing source and gate lines.

The signal lines for controlling the voltage on the electrode 17 of each picture element are not shown in FIGS. 2*a*, 2*b* and 3. The control lines may be laid out as disclosed in international application WO2009/071694. In a special embodiment the signal lines may be used to generate the electric field for the hydrophobicity reduction. FIG. 4 shows a plan view of an electrode structure including the electrode 17 and source lines 40 and gate lines 41 as used in an active matrix display device known from e.g. WO2009/071694. The source and gate lines cross at different heights in the stack of thin layers arranged on the first support plate, permitting individual control of the lines during operation of the display device. During manufacture the same high voltage is applied to both the source lines and the gate lines to form the low-hydrophobicity area 32.

In the above embodiments of the method, the electric field is generated by a voltage applied to electrodes arranged on the first support plate and a conductive fluid on the first support plate. Alternatively, the electric field can be generated by a patterned electrode structure arranged on a plate, which is pressed against the rear side 9 of the first support plate (see FIG. 1) during the manufacture process. The voltage is applied between the electrodes and the conductive fluid in contact with the surface 14. The spatial resolution of this method is lower and the voltage required for permanent charging is higher than those of the above embodiments because of the thickness of the support plate.

Another method of generating the electric field is by using a patterned electrode structure arranged on a plate pressed against the surface 14 and an electrode extending over the plurality of picture elements, e.g. in the form of a metal plate, pressed against the rear side 9. The voltage is applied between the patterned electrode structure and the electrode pressed against the rear side. The method has a high spatial resolution. The latter two methods allow formation of the low-hydrophobicity area 32 independent of the electrodes arranged on the first support plate, which electrodes can be optimised for operating the picture element.

Figure 5:
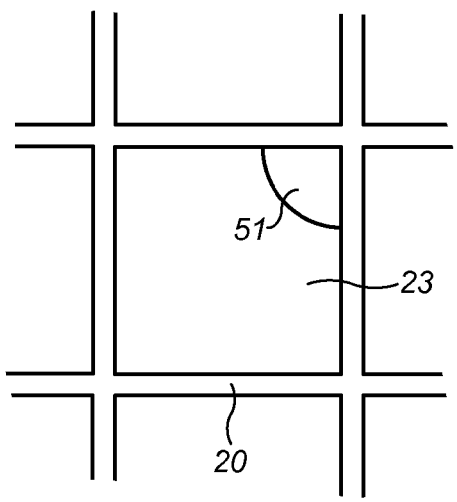
FIG. 5 shows a plan view of another embodiment of the first support plate.

FIG. 5 shows a plan view of another embodiment of the first support plate. The display area 23 is enclosed by the wall 20. A region 51 of the display area has a reduced hydrophobicity. During operation of the picture element, the region 51 acts as an initiation point of the movement of the first fluid 11. The reduced hydrophobicity attracts the second fluid 12 to the surface 14, causing a thinner layer of first fluid over the region 51 when no voltage is applied to the electrode 17. When a voltage is applied to the electrode 17, the thinner layer in region 51 will give rise to a larger force on the first fluid than in other regions of the display area and the first fluid will start moving away from the region 51, which is usually called the initiation point. The region 51 provides thereby a controlled movement of first fluid in each picture element, which improves the image quality. The region 51 forms a similar pattern in substantially all of the picture elements.

The region 51 is made by the method according to the invention. During manufacture of the first support plate, an electric field is temporarily applied over the region 51 of the insulating area using one of the methods set out above. The electric field causes a permanent reduction of the hydrophobicity of the region. The reduction persists during the lifetime of the display device.

Figure 6:
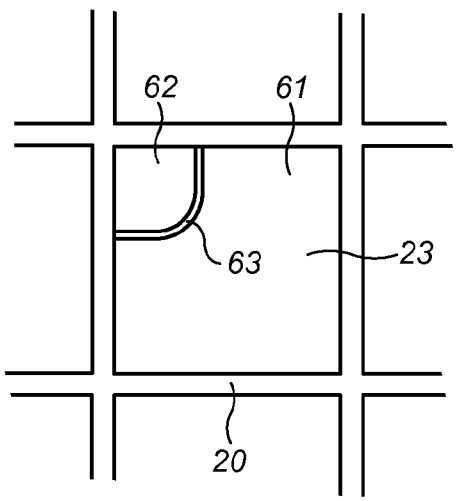
FIG. 6 shows a plan view of a further embodiment of the first support plate.

FIG. 6 shows a plan view of a further embodiment of the first support plate. The display area 23 of the picture element has been divided into two areas 61, 62 having a high hydrophobicity separated by an area 63 having a low hydrophobicity. The area 63 acts as a barrier, allowing the picture element to operate as a bistable element as disclosed in international application WO2006/090317.

Figure 7A:
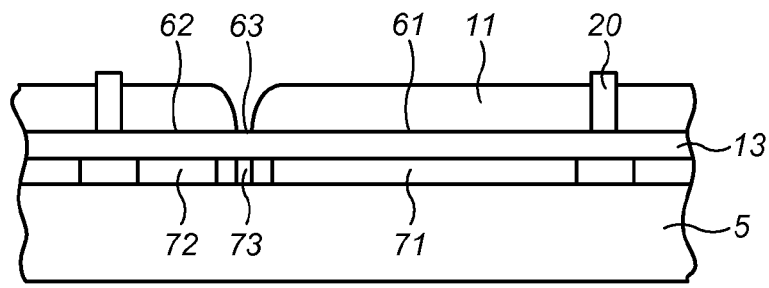
FIGS. 7a and 7b shows a cross-section of two states of a bistable picture element.
Figure 7B:
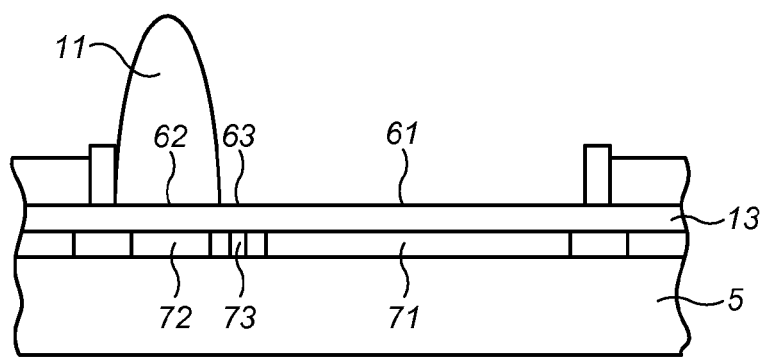

FIG. 7a shows a cross-section of the picture element of FIG. 6. Between the first support plate 5 and the insulating layer 13 electrodes 71, 72 and 73 have been arranged that have the same shape as the areas 61, 62 and 63, respectively. The first fluid 11 will form a layer on the insulating layer 13, interrupted by the barrier area 63, as shown in the Figure. When a sufficiently high voltage is applied to electrode 71, the first fluid will move towards area 62 and accumulate there as shown in FIG. 7b. When the voltage on electrode 71 is switched off, the barrier area 63 will keep the first fluid in the configuration of FIG. 7b, creating a stable display state without applying a voltage. The configuration of FIG. 7a can be obtained again by applying a voltage to the electrode 72, forcing the first fluid to the area 61. The voltage level determines whether some first fluid or no first fluid remains in area 62. A bi-stable colour display can be obtained by combining the embodiment with a barrier according to the invention in one or more sub-pixels with a colour filter. In a preferred embodiment, each sub-pixel would have substantially the same barrier pattern. In another embodiment, a bi-stable colour display can be made by using barriers according to the invention in a display device with multiple layers of first fluid on top of each other, each layer having a different colour, as described, for instance, in chapter 18 of the book Mobile Displays: Technology and Applications, ISBN 978-0-470-72374-6 (Wiley).

The barrier area 63 is made by the method according to the invention, applying during manufacture a high voltage to the electrode 73. The barrier area may have different configurations, as shown in the international application WO2006/090317. The picture element may be operated in the several modes disclosed in said application.

The above embodiments are to be understood as illustrative examples of the invention. Further embodiments of the invention are envisaged. For example, the low-hydrophobicity area may be used in electrowetting elements other than picture elements. It may be used for reducing the hydrophobicity to adhere a layer, such as a wall, onto a hydrophobic surface. It may also be used to control the motion of the first fluid by acting for example as a barrier or an initiation point. The low-hydrophobicity area may be used in electrowetting elements such as a diaphragm, a shutter or a lens.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for making an electrowetting display device comprising a plurality of picture elements; a first support plate and a second support plate,
    each picture element comprising a space between the first support plate and the second support plate, the method comprising the steps of:
    providing the first support plate with an electrode structure;
    arranging an insulating layer on the electrode structure, the insulating layer having a thickness and a hydrophobic surface facing the space;
    temporarily applying an electric field across the thickness of the insulating layer to reduce permanently the hydrophobicity of a predetermined area of the surface.

2. A method according to claim 1, wherein the area forms a similar pattern in substantially all of the picture elements.

3. A method according to claim 1, wherein an electroconductive or polar fluid is arranged on the insulating layer and the electric field is applied between the electrode structure and the fluid.

4. A method according to claim 3, wherein the electrode structure includes at least one electrode for applying the electric field and at least one electrode for operating a picture element or the electrode structure includes at least one electrode both for applying the electric field and operating a picture element.

5. A method according to claim 3, wherein the electric field is made by applying a voltage between the electrode structure and the electroconductive or polar fluid, the voltage on the electrode structure being higher than the voltage on the electroconductive or polar fluid.

6. A method according to claim 3, wherein an electrode in the electrode structure has a neighbouring shield electrode.

7. A method according to claim 1, including the step of arranging walls on the predetermined area.

8. An electrowetting display device comprising a plurality of picture elements; a first support plate and a second support plate,
    each picture element comprising a space between the first support plate and the second support plate, the space comprising a first fluid and a second, electroconductive or polar fluid, the first fluid and second fluid being immiscible, an electrode structure arranged on the first support plate, an insulating layer arranged on the electrode structure and having a hydrophobic surface facing the space, the insulator layer having a predetermined area of reduced hydrophobicity made using a method associated therewith according to claim 1.

9. An electrowetting device according to claim 8, wherein the area of the hydrophobic surface carries a permanent electric charge.

10. An electrowetting display device according to claim 8, wherein the area forms a similar pattern in substantially all of the picture elements.

11. An electrowetting display device according to claim 10, wherein the pattern defines the shape of the picture element and confines the first fluid to the space of the picture element.

12. An electrowetting display device according to claim 10, wherein the pattern defines the shape of the picture element and walls are arranged on the area, the walls confining the first fluid to the space of the picture element.

13. An electrowetting display device according to claim 10, wherein the pattern forms an initiation point for the picture element.

14. An electrowetting display device according to claim 10, wherein the pattern forms a barrier for the first fluid in a picture element.

15. Use of an area of reduced hydrophobicity in an electrowetting device comprising an electrowetting element; a first support plate and a second support plate,
- the electrowetting element comprising a space between the first support plate and the second support plate, the space comprising a first fluid and a second, electroconductive or polar fluid, the first fluid and second fluid being immiscible, an electrode structure arranged on the first support plate, and an insulating layer arranged on the electrode structure having a thickness and a hydrophobic surface facing the space,
- the area having been made by applying temporarily an electric field across the thickness of the insulating layer to reduce permanently the hydrophobicity of the area of the surface,
- said use being control of motion of the fluids or adhering a layer onto the insulating layer.

* * * * *